G. E. BRADSHAW.
MOTORCYCLE FRAME AND THE LIKE.
APPLICATION FILED JULY 20, 1920.

1,368,541.

Patented Feb. 15, 1921.
3 SHEETS—SHEET 1.

G. E. BRADSHAW.
MOTORCYCLE FRAME AND THE LIKE.
APPLICATION FILED JULY 20, 1920.

1,368,541.

Patented Feb. 15, 1921
3 SHEETS—SHEET 2.

Inventor
Granville E. Bradshaw
by
Wm H Babcock & Son
Attorneys

G. E. BRADSHAW.
MOTORCYCLE FRAME AND THE LIKE.
APPLICATION FILED JULY 20, 1920.

1,368,541.

Patented Feb. 15, 1921.
3 SHEETS—SHEET 3.

UNITED STATES PATENT OFFICE.

GRANVILLE EASTWOOD BRADSHAW, OF WALTON-ON-THAMES, ENGLAND, ASSIGNOR TO A. B. C. MOTORS LIMITED, OF WALTON-ON-THAMES, ENGLAND.

MOTORCYCLE-FRAME AND THE LIKE.

1,368,541.      Specification of Letters Patent.      Patented Feb. 15, 1921.

Application filed July 20, 1920. Serial No. 397,743.

*To all whom it may concern:*

Be it known that I, GRANVILLE EASTWOOD BRADSHAW, a subject of the King of Great Britain and Ireland, residing at A. B. C. Motor Works, Walton-on-Thames, in the county of Surrey, England, have invented certain new and useful Improvements in and Relating to Motorcycle-Frames and the like, of which the following is a specification.

My invention consists of improvements in and relating to motorcycle frames (including scooters), and has for its object the prevention of bent footrests and twisted frames in the course of a fall, increased lateral rigidity of the stays which carry the back wheel, particularly in the case of a rear sprung machine, increased protection from road dirt, decreased resistance to sliding on the ground when the machine falls over and greatly increased space for accommodating engine gear box, and other details, without the necessity of increasing the overall length of the machine. It also provides a neat and accessible accommodation for tools.

Made according to my invention the lower main tubes, which are duplex, are carried from the head stem lug more or less and the side of each tube is extended laterally to approximately the maximum width of what would otherwise be the footrests or footboards. They may taper from the head lug downward, and may be cross braced in any suitable known manner.

At the rear, tubes, which are still a considerable distance apart, are carried upward in a suitable manner to the seat lug, and the rear stays may be attached to these tubes, which attachment would thus be very wide and insure lateral rigidity. The attachment may be hinged for the purpose of accommodating the movement of the back wheel in the case of a sprung rear section.

A complete undershield may be fitted between these two tubes, which may extend upward in front to form a mud-shield and if desired the engine may be placed laterally across the frame, and even in the case of a twin cylinder horizontally opposed engine being fitted in this position, the overall width of the tubes would still be wider than the overall length of the engine, thus preventing damage to the cylinder heads in the case of a fall. This undershield may be perforated or fitted with louvers or openings of any known sort, to allow air to pass on the cylinder for cooling, or to allow oil or water to drain away underneath the engine.

Footplates may be fitted to this undershield in such a manner that they may form the lid or covering of shallow tool cases, which may be attached to the undershield in the form of a tray, and the tools may be prevented from shaking or rattling by any known means, as for instance, by laying a piece of felt in the bottom of the tray, and on which may be placed a piece of wood cut to the shape of the various tools.

Such type of frame would probably not require a tube under the fuel tank, which tank may be flexibly mounted on pivots in any known manner at the front and the back, which pivots may work at right angles to one another, or the tank may be carried on strips of thin metal which would be flexible enough to prevent vibration and leakage.

The main lower tubes of the frame above referred to may be smooth and without projections, so that in the case of a bad fall they would form skids which would slide along the ground instead of digging into the ground as happens with the usual type of footrest. This latter arrangement causes the machine to be brought to rest very quickly and imposes considerable stresses.

Though I do not claim any particular kind of stand, my invention enables a stand to be attached to any cross member between the two lower tubes above referred to and the stand may be of considerable width between the legs thereby insuring increased rigidity. It may also be of any duplex type, that is, two stands combined into one with legs of different length so that when lowering the shorter stand it is not necessary to raise the rear wheel above the ground when the machine is just required to be propped up and the longer legs may be lowered if it is required to rotate or remove the rear wheel.

This arrangement of frame gives adequate space for the installation of dynamos, batteries, etc., in a relatively low position to keep the center of gravity of the machine as near the ground as possible, and it enables the complete engine, clutch gear box, and rear drive unit to be fitted.

My invention will now be more particularly described and illustrated by means of the accompanying drawings in which.

The same reference characters apply to the same or similar parts in all figures.

Figure 1:
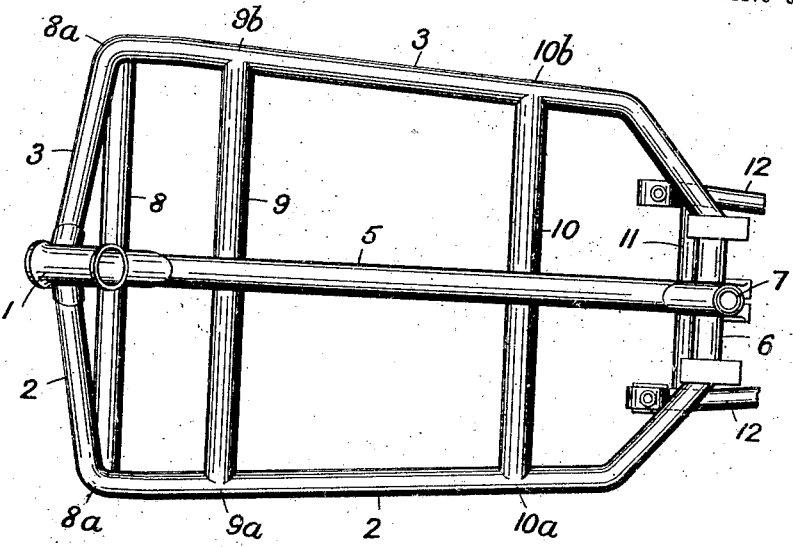
Figure 1 is a plan of the frame of a motor cycle.
Figure 2:
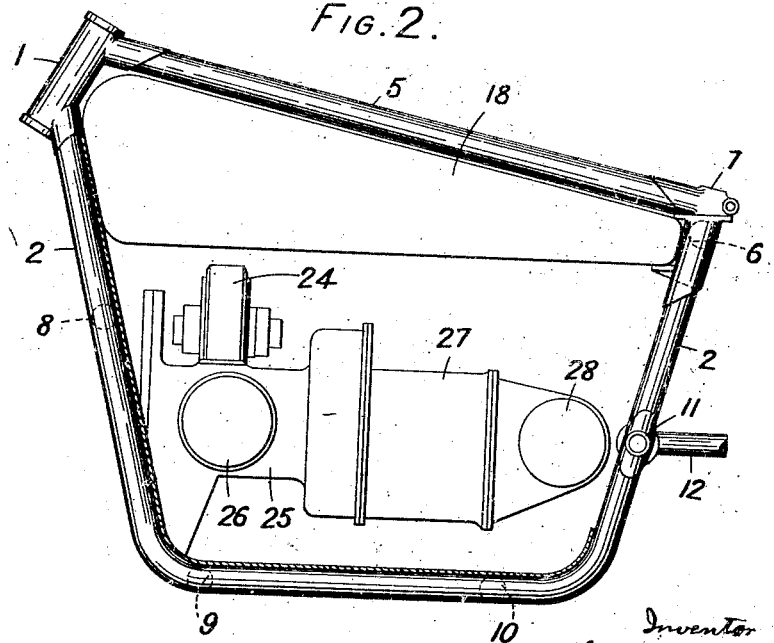
Fig. 2 is a side elevation of the same.
Figure 4:
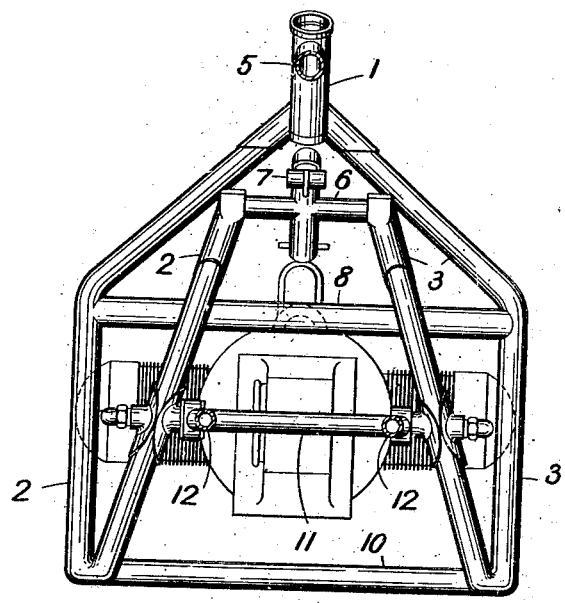
Fig. 4 is a rear elevation of the frame.

Referring to the said drawings, 1 is the head stem lug to which the top bar 5 of the frame is attached. The rear end of the top bar 5 is attached to the seat lug 7, which carries also a cross tube 6. Two main lower tubes 2 and 3 are attached to the head stem lug 1, one on each side, and they are set at an angle which carries them outward, downward and backward to points 8$^a$ and 8$^a$ respectively where a cross tube 8 connects them together. The length of the tube 8 will depend on the breadth which it is desired to give the frames to provide room for, and protect, the mechanism to be carried as explained hereinafter. From the points 8$^a$ the tubes 2 and 3 are continued backward and downward, (and inward, outward or parallel as desired), to the points 9$^a$ and 9$^b$ respectively, where they are connected by a cross tube 9. The tubes 2 and 3 are continued back approximately horizontal and parallel or converging or diverging to the points 10$^a$ and 10$^b$ where they are connected by a cross tube 10. The tubes 2 and 3 are then continued toward the rear and when the desired length of the horizontal part of frame is completed are bent up to meet the respective ends of the cross tube 6. (For the sake of clearness in Fig. 4 only the ends of the top bar 5 are shown.) To the tubes 2 and 3 at a point below the cross bar 6 is attached a cross bar 11 to which the stays 12 for the back wheel are attached. These stays 12 may be hinged on the bar 11 to accommodate the movement of the back wheel in the case of a sprung rear section. Fig. 2 indicates the position of a petrol tank 18 and an engine with gear box, magneto, etc. 19 inside the frame.

Figure 3:
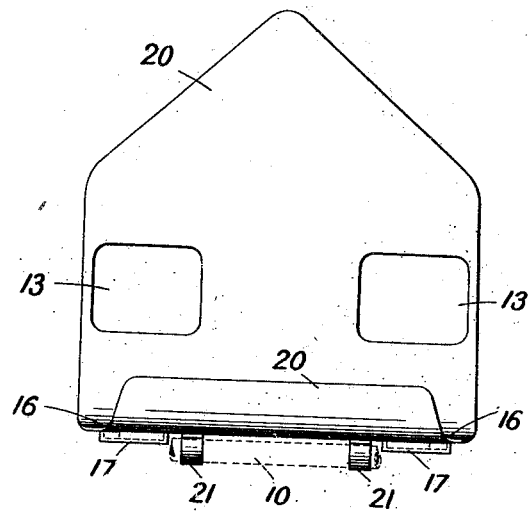
Fig. 3 is a rear end elevation of a shield for attachment to the frame.
Figure 5:
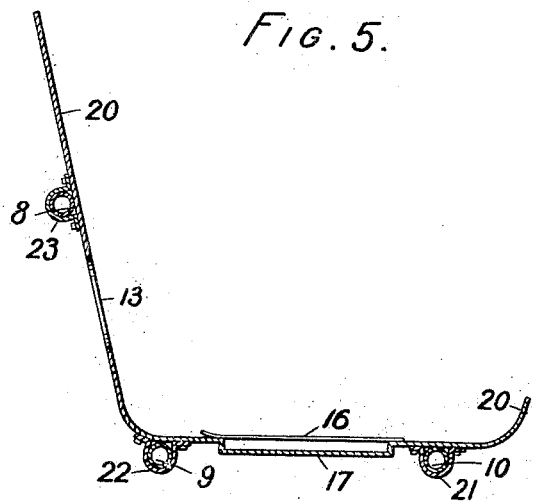
Fig. 5 is a side elevation of the shield.
Figure 6:
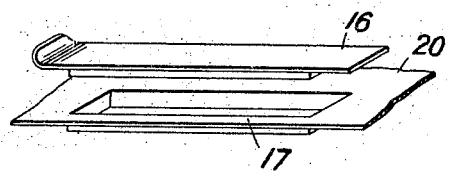
Fig. 6 shows the detail of a tool box and footboard as fitted in the shield.

In Figs. 3 and 5, 20 is a shield which is shaped to cover the space between the two lower main tubes 2 and 3 from the head stem lug 1 to a point below the cross tube 11 thus protecting driver and mechanism from mud and dirt. The shield 20 is fitted with apertures 13 for air for cooling purposes and clips, straps or other means 21, 22 and 23 to secure it to cross tubes 10, 9 and 8 respectively.

In the sides of the horizontal part of shield, shallow tool boxes 17 are formed of which the lids 16 are the footboards.

I do not confine myself to the exact shape of the frame shown in the drawings, or to the number and disposition of bars or tubes, or to the shape of the shield, air vents, tool boxes or footboards. I may, for instance, decide to employ more than one top bar 5 and in practice it may prove advantageous to have two of such top tubes either parallel or inclined to one another. In either case the top tube or tubes will be the top part of the frame, the side tubes will be the side parts thereof and the cross-tubes will be the cross parts. Their relation to each other and action in the frame would manifestly be the same if made solid instead of tubular; but a tubular frame is preferable for the combination of lightness and strength.

I claim—

1. A motorcycle frame provided with a longitudinal top part and two longitudinal side parts connected thereto, said side parts extending divergently downward and considerably outward laterally at each end to their middle portions, which are parallel and occupy about the locations that would ordinarily be given to footboards, said side parts serving to lessen friction when the motor cycle turns over on either side, by preventing contact with the ground of any part of the machine except the wheels and one side part.

2. A motorcycle frame provided with a longitudinal top part and two longitudinal side parts connected thereto, said side parts extending divergently downward to a plane lower than the operating machinery and laterally beyond the same and having middle parts widely separated by substantially parallel parts for lessening friction as set forth when the motor cycle turns over on either side.

3. A motorcycle frame provided with a longitudinal top part and two longitudinal side parts extending downward and outward therefrom and cross parts connecting and bracing at intervals said side parts, the said side parts being constructed for the motorcycle to slide partly on one or the other of them for lessening friction when the motorcycle is overturned on either side.

4. A motorcycle frame comprising a longitudinal top tube and two longitudinal side tubes rigid therewith, said side tubes diverging outward and downward at both ends of the frame and having integral parallel middle parts outside of the operating mechanism and with a wide interval between them, in order that the motorcycle may slide on one or the other of them, thus lessening friction, if it be overturned on either side.

5. A motorcycle frame comprising a longitudinal top part, two longitudinal side parts, a head lug connecting said top part and side parts at one end of the frame, and a seat lug provided with a cross part connecting said top part and side parts at the other end of the frame, said side parts being bent laterally in opposite directions, extending downwardly and provided with widely separated substantially parallel middle portions, one of which will act as a skid in case the motorcycle should overturn on either side, preventing the contact of any part of the machine with the ground except the wheels and said skid.

6. A motorcycle frame comprising a longitudinal top part, two longitudinal side parts connected therewith and two mainstays extending rearward from said side parts to support forks for the rear wheel of the machine, said side parts forming skids outside of the operating mechanism adapted to prevent any part of the machine from contact with the ground in case it should turn over on either side, except the wheels and one of said skids.

7. A motorcycle frame having two lateral longitudinal skids adapted to prevent any part of the machine from contact with the ground except the wheels and one of said skids, in case the machine should turn over on either side, said skids being provided with a shield which covers the bottom and sides of the space between them to protect the operating mechanism.

8. A motorcycle frame having two lateral longitudinal skids substantially as described and provided with a shield below the operating mechanism, in which shield two tool boxes are formed, their lids serving as footboards.

In testimony whereof, I have signed my name to this specification in the presence of two subscribing witnesses.

GRANVILLE EASTWOOD BRADSHAW.